United States Patent [19]

Edouard et al.

[11] Patent Number: 4,799,777
[45] Date of Patent: Jan. 24, 1989

[54] MULTI-FREQUENCY ACOUSTO-OPTIC MODULATION PROCESS AND APPARATUS

[75] Inventors: Bridoux Edouard; Camus Lievin; Bruneel Christian; Gazalet Marc; Roger Torguet, all of Valenciennes, France

[73] Assignee: Centre National De La Recherche Scientifique, Paris, France

[21] Appl. No.: 32,349

[22] Filed: Mar. 31, 1987

[30] Foreign Application Priority Data

Apr. 2, 1986 [FR] France ................ 86 04710

[51] Int. Cl.⁴ .................. G02F 1/11; G02F 1/33
[52] U.S. Cl. ...................... 350/358; 350/353
[58] Field of Search ................ 350/358, 353

[56] References Cited

U.S. PATENT DOCUMENTS 4,336,981  6/1982  Mori .................... 350/358
4,444,478  4/1984  Ioka et al. ............. 350/358

FOREIGN PATENT DOCUMENTS 74515  6/1980  Japan .................... 350/358

GB 2036996  7/1980  United Kingdom .

OTHER PUBLICATIONS

"Efficiency Stabilization for Multi-Beam Acouso-Optic Modulators", C. H. Claassen, *IBM Technical Disclosure Bulletin*, Oct. 1979.

Primary Examiner—Eugene R. Laroche
Assistant Examiner—Nathan W. McCutcheon
Attorney, Agent, or Firm—Larson & Taylor

[57] ABSTRACT

A process for acousto-optic modulation of a monochromatic light beam, delivered by a laser, consists in deflecting the light beam in an acousto-optic modulator which receives a composite electric signal. The composite signal has at least one modulation frequency. It further includes two compensation components. The overall acoustic power applied to the modulator is maintained at a substantially constant value by servo-controlling the electric power of the two compensation components having frequencies which are mutually different and different from the modulation frequency or frequencies.

2 Claims, 1 Drawing Sheet

MULTI-FREQUENCY ACOUSTO-OPTIC MODULATION PROCESS AND APPARATUS

BACKGROUND OF THE INVENTION

1. Technical field

The invention relates to the processes and devices for acousto-optic modulation. It is suitable for use in all technical fields where it is necessary to modulate a monochromatic light beam, typically delivered by a laser, an important application being alphanumeric character printing in a laser printer.

Acousto-optic modulators or deflectors, which will be designated hereunder as AOM's, are widely used. In an AOM, a monochromatic light beam is deflected by an angle a which is in direct relation with the frequency f of the acoustic wave generated in the modulator by a transducer responsive to an electrical driving signal. If a plurality of modulation signals at different frequencies $f_1$, $f_2$, $f_3$, . . . are simultaneously applied, the entering monochromatic light beam is divided into an aligned light beam of zero order and a plurality of deflected beams emerging from the AOM along directions at respective angles $a_1$, $a_2$, $a_3$, . . . with the aligned beam. The optical intensity of each deflected beam is a direct function of the power of the respective electrical signal which is applied to the AOM. It is consequently possible to modulate the intensities of the deflected beams by amplitude modulation of the components at different frequencies of a composite electric signal applied to the AOM.

A disadvantage of the current AOMs is that their response is not linear, except for very low efficiencies (efficiency being defined as the ratio between the intensity of the deflected beam and the intensity of the entering beam). For obtaining a significant output power, it becomes necessary to operate out of the linearity zone and consequently:

- each time the modulator is used with a high efficiency, there are distorsion and saturation which result in contrast degradation,
- if the applied electric signal has a plurality of components at different frequencies, there is cross-talk or cross-modulation.

2. Prior Art

Attempts have already been made for reducing cross-talk in multi-frequency AOM systems by adding a single compensation or dummy electric signal to the input signal having a plurality of modulation channels at different frequencies. That electrical compensation signal has a fixed frequency which is typically selected at a value higher or lower than all frequencies $f_1$, $f_2$, . . . of the components of the driving signal. As a result, there is excess compensation for those optical channels which are modulated at frequencies close to the frequency of the compensation signal and is not sufficient for the channels having the frequencies most spaced from the compensation frequency.

That problem still exists and limits the possibilities of the system even when the compensation signal is servo-controlled for maintaining the total electric power applied to the AOM at a substantially constant value, as disclosed for instance in British Pat. No. 2,036,996 (Mori).

SUMMARY OF THE INVENTION

A main object of the invention is to provide an acousto-optic modulation process with improved linearity and cross-modulation compensation while authorizing operation with a control signal having a plurality of components at different frequencies.

In a process according to the invention, an entering monochromatic light beam is directed to an acousto-optic modulator; a composite electrical signal having at least one modulation frequency is applied to said acousto-optic modulator; and the total acoustic power applied to the modulator is maintained at a substantially constant value by servo-controlling the electric power of at least two compensation components of the composite signal having frequencies which are mutually different and different from said at least one modulation frequency.

In a typical process, the composite signal has a plurality of modulation components at different frequencies and then the composite signal preferably has two compensation components one of which has a frequency lower than all modulation frequencies and the other of which has a frequency which is higher than all modulation frequencies.

The invention will be better understood from the following description of a particular embodiment, given as an example only.

DESCRIPTION OF PREFERRED EMBODIMENTS

Figure 1:
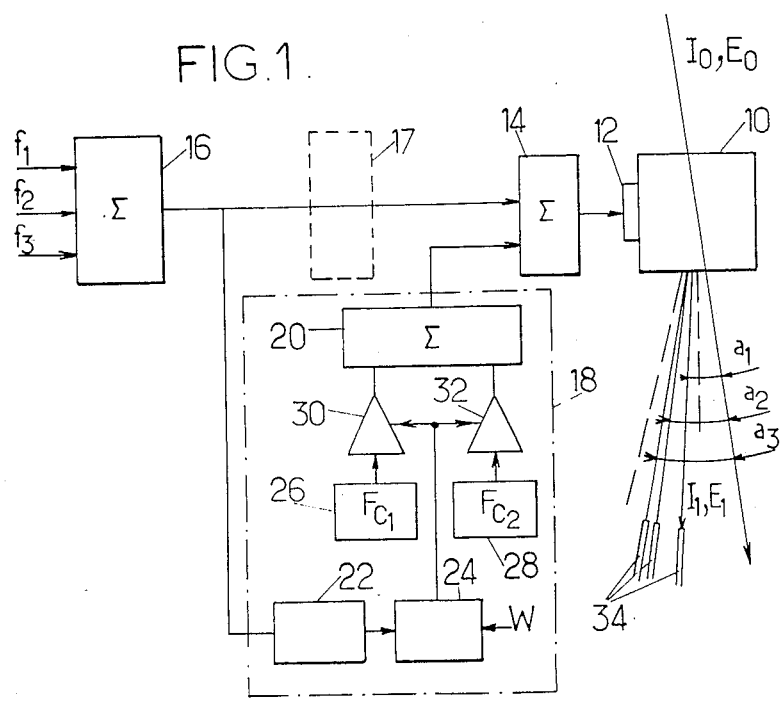
FIG. 1 is a block diagram of a possible arrangement of a modulation device having two compensation channels for eliminating cross-talk.

Referrring to FIG. 1, a device has an AOM 10 which may be of conventional construction and is provided with a transducer 12 for transforming a driving electric signal into a control acoustic signal. Since such AOMs and their usual environment are well known in the art, there is no need to describe them. However, reference may be made if necessary to British Pat No. 2,038,996 referred to above and U.S. Pat. No. 4,444,470 (Ioka et al).

Before the invention is described, it may be useful to summarize the properties of a wide band conventional AOM. If S designates the amplitude of an acoustic signal at a single frequency applied by transducer 12, the relation between the electrical field $E_1$ of the diffracted beam, the electric field $E_0$ of the entering beam and S is :

$$E_1 = E_0 \text{ sine } A \cdot S$$

where A is a constant value.

That relation is only valid in the approximation of Bragg. It is a non-linear function of S.

Similarly, the relation between the light intensity $I_i$ of a beam deflected by a modulation signal at high frequency $f_i$ (diffraction order 1), the light intensity $I_0$ of the entering beam and the power P of the acoustic wave is:

$$I_1 = I_0 \text{ sine}^2 B\sqrt{P}$$

where B is a constant value.

Due to cross-talk, the intensity $I_i$ of each of the deflected beams (having respective intensities $I_1$, $I_2$, $I_3$, . . . ) is determined not only by the amplitude of the component at frequency $f_i$, but also by the other components. For avoiding cross-talk, a composite signal is applied to transducer 12 which consists of the sum of a plurality of signals, produced in a wide band mixer 14.

The composite signal is obtained by summing:

a useful modulation signal which contains all drive components at frequencies $f_1$, $f_2$, $f_3$, ...

a compensation signal consisting of two components at frequencies $F_1$ and $F_2$, with:

$$F_1 < f_1 < f_2 < f_3 < \ldots < F_2$$

The overall acoustic power applied to the AOM 10 should be maintained at a substantially constant value. In other words, if $P_i$ is the acoustic power applied at any time by a component of order i of the modulation signal and if $P_{ci}$ is the power due to the component of order i of the compensation signal, the compensation signal should be continuously servo-controlled for making the sum of all acoustic signals constant.

$$\Sigma P_i + \Sigma P_{ci} = W$$

where W is a constant value which is so selected as to be greater than or equal to $\Sigma P_i$ when each $P_i$ has its maximum value.

In the embodiment illustrated in FIG. 1, the drive signal comprises three components at fixed frequencies $f_1$, $f_2$ and $f_3$ and of variable amplitudes. They are summed in a mixer 16. The output signal of mixer 16 is applied to one of the inputs of a second mixer 14. The other input of mixer 14 receives a compensation signal from a compensation control circuit 18. A time delay circuit 17 may be located between mixer 16 and 14 and delay transmission by such an amount that mixer 14 receives the drive signal when the corresponding correction has been made available by circuit 18 which has a time constant.

Circuit 18 has a mixer 20 which sums two compensation components having fixed respective frequencies $F_{c1}$ and $F_{c2}$, whose amplitudes are servo-controlled responsive to the power delivered by mixer 16. That power $\Sigma P_i$ is measured by a conventional measurement circuit 22 which applies a voltage signal to a subtraction input of a subtractor 24 whose sum input receives a signal representing W.

The compensating circuit 18 further includes means for generating the components of the compensation signal and regulating their cumulated power $\Sigma P_{ci}$. As illustrated in FIG. 1, where the compensation signal has two components at frequencies $F_{c1}$ and $F_{c2}$, compensation control circuit 18 has two oscillators 26 and 28 driving respective amplifiers 30 and 32. Each amplifier has a gain control input and the gain is in direct relation with the voltage applied to that input.

In a first embodiment, the power necessary for compensation is equally distributed between the two components at frequencies $F_{c1}$ and $F_{c2}$. Then, the same gain control signal may be applied to amplifiers 30 and 32. The voltage of the gain control signal will have to vary as the square root of the difference $W - \Sigma P_i$. That square root may be computed by a circuit (not shown) located between subtractor 24 and the gain control inputs of the amplifiers.

In that embodiment, the light intensities $I_1$, $I_2$, $I_3$ of the deflected signals collected by respective detectors 34 (optical fibers for instance) exhibit considerably reduced cross-talk, particularly when frequencies $F_{c1}$ and $F_{c2}$ are quite close to the most spaced control frequencies and correspond to dummy beams close to the useful beams, as shown in dash lines on FIG. 1.

In another embodiment, the acoustic power is so distributed between frequencies $F_{c1}$ and $F_{c2}$ that each compensating channel mostly compensates those useful channels of the AOM which are closest to them, which can be done with a different construction of circuit 18.

It may be preferable under certain conditions to use frequencies $F_{c1}$ and $F_{c2}$ within the range containing frequencies $f_i$ and to use more than two compensation frequencies $F_c$.

Figure 2:
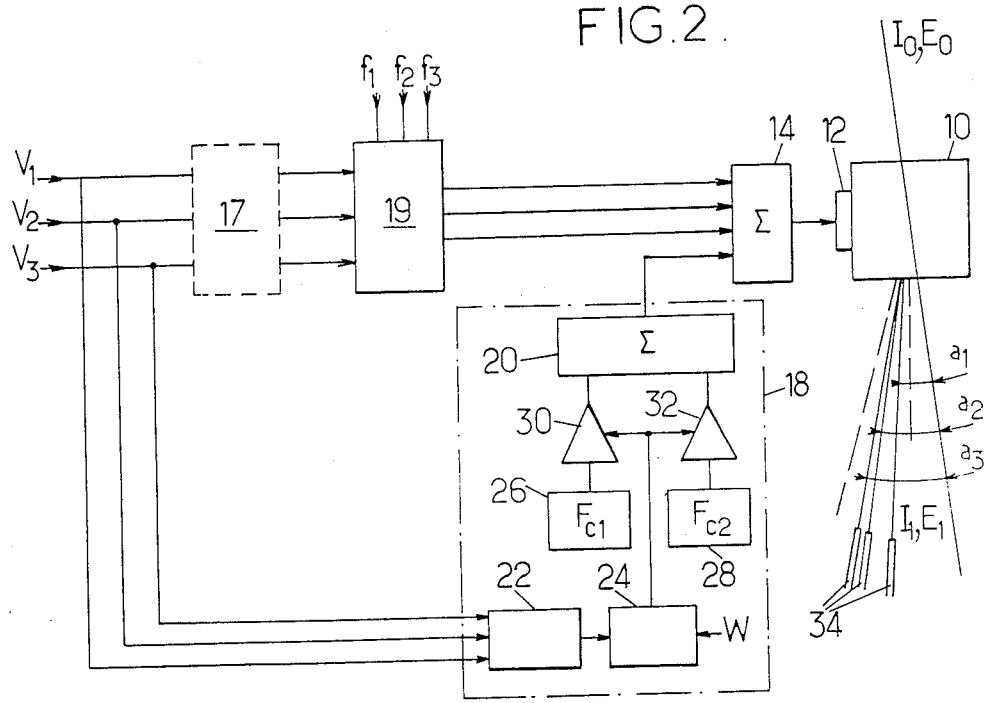
FIG. 2, similar to FIG. 1, illustrates a modification.

Referring to FIG. 2, a modified embodiment is illustrated, in which the components corresponding to FIG. 1 are designated by the same reference numerals. Circuits 22 and 24 generate compensation control signals derived from the amplitudes $V_1$, $V_2$, ... of the modulation signals rather than such signals. Then, the modulation signals are generated in a modulation circuit 19 in which each drive signal having an amplitude $V_i$ modulates a carrier having a specific frequency $f_i$.

We claim:

1. In a process for acousto-optic modulation of a light beam comprising:

applying a composite electrical signal having a plurality of drive components at different specific modulation frequencies and having two compensation components one of which has a frequency lower than all the frequencies of all said drive components and the other of which has a frequency which is higher than all the frequencies of all said drive components to a transducer of an acousto-optic modulator, and directing an entering monochromatic light beam into said acousto-optic modulator for delivery of deflected output beams, the improvement consisting in servo-controlling the cumulated electric power of said two compensation components to maintain the total acoustic power applied to the modulator by said transducer at a substantially constant value and distributing said cumulated electric power equally between the two said compensation components.

2. Process according to claim 1, wherein said servo-controlling includes the steps of: summing the individual powers of all said drive components; subtracting the resulting sum from a predetermined constant value to obtain a power difference signal; computing the square root of said power difference signal to obtain a gain control signal; generating two compensation signals having the same predetermined power and each having the frequency of one of said compensation components; and controlling amplification of both said compensation signals with said gain control signal so as to obtain said compensation components.

* * * * *